J. A. GARVER.

WHEELBARROWS.

No. 7,190. Reissued June 27, 1876.

WITNESSES:

W. W. Hollingsworth

J. C. Kenion

INVENTOR:

John A. Garver

BY Munn & Co

ATTORNEYS.

N. PETERS, PHOTO-LITHOGRAPHER, WASHINGTON, D. C.

UNITED STATES PATENT OFFICE.

JOHN A. GARVER, OF BRYAN, OHIO.

IMPROVEMENT IN WHEELBARROWS.

Specification forming part of Letters Patent No. 149,737, dated April 14, 1874; reissue No. 7,190, dated June 27, 1876; application filed June 9, 1876.

*To all whom it may concern:*

Be it known that I, JOHN A. GARVER, of Bryan, in the county of Williams and State of Ohio, have invented a new and useful Improvement in Wheelbarrows; and I do hereby declare that the following is a full, clear, and exact description of the same, reference being had to the accompanying drawings, forming part of this specification, in which—

Figure 1:
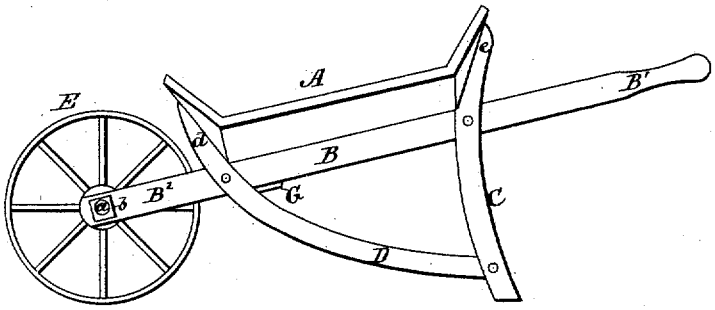
Figure 2:
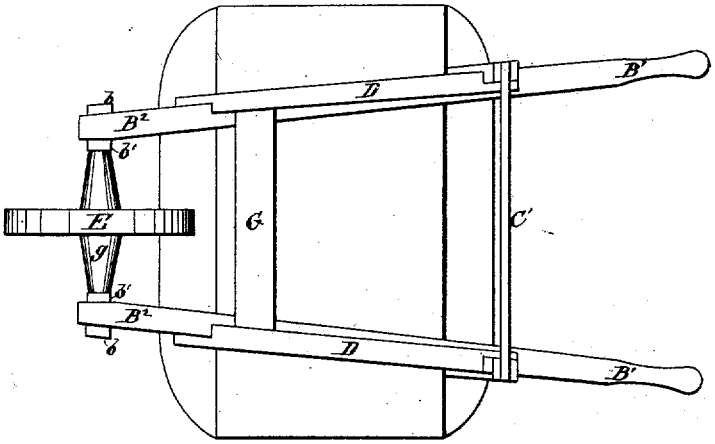

Figure 1 is a representation of a side view of my wheelbarrow. Fig. 2 is an inverted plan view of the same.

This invention has relation to wheelbarrows for moving heavy loads, wherein the parts composing the barrows require to be made very strong, and to be substantially braced. It consists, mainly, in the use of legs and braces therefor, which are connected below the rails of the barrow, and extend above them to form supports for the tray, as hereinafter explained.

In the drawing, A designates the receiver or tray, and B the bars or rails, on which the tray is rigidly secured by means of bolts. The rear extensions of the rails B form the handles $B^1$ of the barrow, and the front extensions form the wheel-arms $B^2$. C C designate the legs, and D D the braces for these legs. E represents the wheel, which, with the hub *g*, I shall cast entire. A bolt or axle, *a*, passes loosely through the hub *g*, and through the ends of the arms $B^2$, and receives nuts *b b* on its ends. The nuts *b′ b′*, inside of the arms, and the outside nuts *b b*, secure the bolt *a* rigidly in place, and tie together the arms, so that they will not spread under the roughest usage. The braces D and legs C are secured together and to the rails B by means of suitable bolts. The upper ends *d* and *e* of these legs and braces extend above the rails B, and are properly beveled to receive the tray A, and afford supports for its front and rear sides. G represents a cross-piece, which is bolted to the under sides of the rails B, near the front attachments of the braces D, for the purpose of sustaining these rails against spreading. A bar, C′, is also secured to the lower ends of the legs C, to prevent them from spreading, and to sustain them against lateral strain.

What I claim as new, and desire to secure by Letters Patent, is—

The connected braces D and legs C, combined with the rails B, and having the extensions *d* and *e* above the rails, for receiving, holding, and supporting the tray A, substantially as described.

JOHN A. GARVER.

Witnesses:

A. H. HERRICK,

F. A. PERCIVAL.